US008427490B1

(12) United States Patent
Luu et al.

(10) Patent No.: US 8,427,490 B1
(45) Date of Patent: Apr. 23, 2013

(54) VALIDATING A GRAPHICS PIPELINE USING PRE-DETERMINED SCHEDULES

(75) Inventors: Viet-Tam Luu, San Jose, CA (US); Russell Pflughaupt, San Jose, CA (US)

(73) Assignee: Nvidia Corporation, Santa Clara, CA (US)

( * ) Notice: Subject to any disclaimer, the term of this patent is extended or adjusted under 35 U.S.C. 154(b) by 18 days.

(21) Appl. No.: 10/846,175

(22) Filed: May 14, 2004

(51) Int. Cl.
*G06T 1/00* (2006.01)
*G06T 1/20* (2006.01)
*G09G 5/36* (2006.01)

(52) U.S. Cl.
USPC .................... 345/522; 345/506; 345/556

(58) Field of Classification Search .................. 345/501, 345/522, 506, 581, 582, 589, 592, 611, 519, 345/556; 719/321, 323, 327, 328; 712/220, 712/221, 223, 209
See application file for complete search history.

(56) References Cited

U.S. PATENT DOCUMENTS

| 3,091,657 | A | 5/1963 | Stuessel |
| 3,614,740 | A | 10/1971 | Delagi et al. |
| 3,987,291 | A | 10/1976 | Gooding et al. |
| 4,101,960 | A | 7/1978 | Stokes et al. |
| 4,541,046 | A | 9/1985 | Nagashima et al. |
| 4,566,005 | A | 1/1986 | Apperley et al. |
| 4,748,585 | A | 5/1988 | Chiarulli et al. |
| 4,897,717 | A | 1/1990 | Hamilton et al. |
| 4,958,303 | A | 9/1990 | Assarpour et al. |
| 4,965,716 | A | 10/1990 | Sweeney |
| 4,965,751 | A | 10/1990 | Thayer et al. |
| 4,985,848 | A | 1/1991 | Pfeiffer et al. |
| 5,040,109 | A | 8/1991 | Bowhill et al. |
| 5,047,975 | A | 9/1991 | Patti et al. |
| 5,175,828 | A | 12/1992 | Hall et al. |
| 5,179,530 | A | 1/1993 | Genusov et al. |
| 5,197,130 | A | 3/1993 | Chen et al. |
| 5,210,834 | A | 5/1993 | Zurawski et al. |
| 5,263,136 | A | 11/1993 | DeAguiar et al. |
| 5,327,369 | A | 7/1994 | Ashkenazi |
| 5,357,623 | A | 10/1994 | Megory-Cohen |
| 5,375,223 | A | 12/1994 | Meyers et al. |
| 5,388,206 | A | 2/1995 | Poulton et al. |
| 5,388,245 | A | 2/1995 | Wong |
| 5,418,973 | A | 5/1995 | Ellis et al. |

(Continued)

FOREIGN PATENT DOCUMENTS

| DE | 29606102 | 6/1996 |
| JP | 07-101885 | 4/1995 |

(Continued)

OTHER PUBLICATIONS

Brown, Brian; "Data Structures And Number Systems"; 2000; http://www.ibilce.unesp.br/courseware/datas/data3.htm.*

(Continued)

*Primary Examiner* — Joni Hsu (57) ABSTRACT

Determining a schedule of instructions for an integrated circuit graphics pipeline. The method includes accessing a state of a host system. The state comprises operations to be performed on fragments to be processed by the graphics pipeline. The method further includes determining a vector based on the state and indexing a table based on the vector to obtain a predetermined listing and ordering of macro-operations to be executed. The method still further includes determining instructions for programming the graphics pipeline based the executing of the macro-operations in the scheduled order.

39 Claims, 5 Drawing Sheets

U.S. PATENT DOCUMENTS

| | | | |
|---|---|---|---|
| 5,430,841 A | 7/1995 | Tannenbaum et al. | |
| 5,430,884 A | 7/1995 | Beard et al. | |
| 5,432,905 A | 7/1995 | Hsieh et al. | |
| 5,517,666 A | 5/1996 | Ohtani et al. | |
| 5,522,080 A | 5/1996 | Harney | |
| 5,560,030 A | 9/1996 | Guttag et al. | |
| 5,561,808 A | 10/1996 | Kuma et al. | |
| 5,574,944 A | 11/1996 | Stager | |
| 5,627,988 A | 5/1997 | Oldfield | |
| 5,644,753 A | 7/1997 | Ebrahim et al. | |
| 5,649,173 A | 7/1997 | Lentz | |
| 5,666,169 A | 9/1997 | Ohki et al. | |
| 5,682,552 A | 10/1997 | Kuboki et al. | |
| 5,682,554 A | 10/1997 | Harrell | |
| 5,706,478 A | 1/1998 | Dye | |
| 5,754,191 A | 5/1998 | Mills et al. | |
| 5,761,476 A * | 6/1998 | Martell | 712/219 |
| 5,764,243 A * | 6/1998 | Baldwin | 345/506 |
| 5,784,590 A | 7/1998 | Cohen et al. | |
| 5,784,640 A | 7/1998 | Asghar et al. | |
| 5,796,974 A | 8/1998 | Goddard et al. | |
| 5,802,574 A | 9/1998 | Atallah et al. | |
| 5,809,524 A | 9/1998 | Singh et al. | |
| 5,812,147 A | 9/1998 | Van Hook et al. | |
| 5,835,788 A | 11/1998 | Blumer et al. | |
| 5,848,254 A | 12/1998 | Hagersten | |
| 5,920,352 A | 7/1999 | Inoue | |
| 5,925,124 A | 7/1999 | Hilgendorf et al. | |
| 5,940,090 A | 8/1999 | Wilde | |
| 5,940,858 A | 8/1999 | Green | |
| 5,949,410 A | 9/1999 | Fung | |
| 5,950,012 A | 9/1999 | Shiell et al. | |
| 5,978,838 A | 11/1999 | Mohamed et al. | |
| 5,999,199 A | 12/1999 | Larson | |
| 6,009,454 A | 12/1999 | Dummermuth | |
| 6,016,474 A | 1/2000 | Kim et al. | |
| 6,041,399 A | 3/2000 | Terada et al. | |
| 6,049,672 A | 4/2000 | Shiell et al. | |
| 6,073,158 A | 6/2000 | Nally et al. | |
| 6,092,094 A | 7/2000 | Ireton | |
| 6,108,766 A | 8/2000 | Hahn et al. | |
| 6,112,019 A | 8/2000 | Chamdani et al. | |
| 6,131,152 A | 10/2000 | Ang et al. | |
| 6,141,740 A | 10/2000 | Mahalingaiah et al. | |
| 6,144,392 A | 11/2000 | Rogers | |
| 6,150,610 A | 11/2000 | Sutton | |
| 6,189,068 B1 | 2/2001 | Witt et al. | |
| 6,192,073 B1 | 2/2001 | Reader et al. | |
| 6,192,458 B1 | 2/2001 | Arimilli et al. | |
| 6,208,361 B1 * | 3/2001 | Gossett | 345/536 |
| 6,209,078 B1 | 3/2001 | Chiang et al. | |
| 6,222,552 B1 | 4/2001 | Haas et al. | |
| 6,230,254 B1 | 5/2001 | Senter et al. | |
| 6,239,810 B1 | 5/2001 | Van Hook et al. | |
| 6,247,094 B1 | 6/2001 | Kumar et al. | |
| 6,252,610 B1 | 6/2001 | Hussain | |
| 6,292,886 B1 | 9/2001 | Makineni et al. | |
| 6,301,600 B1 | 10/2001 | Petro et al. | |
| 6,314,493 B1 | 11/2001 | Luick | |
| 6,317,819 B1 | 11/2001 | Morton | |
| 6,351,808 B1 | 2/2002 | Joy et al. | |
| 6,370,617 B1 | 4/2002 | Lu et al. | |
| 6,437,789 B1 | 8/2002 | Tidwell et al. | |
| 6,438,664 B1 | 8/2002 | McGrath et al. | |
| 6,480,927 B1 | 11/2002 | Bauman | |
| 6,490,654 B2 | 12/2002 | Wickeraad et al. | |
| 6,496,902 B1 | 12/2002 | Faanes et al. | |
| 6,499,090 B1 | 12/2002 | Hill et al. | |
| 6,525,737 B1 * | 2/2003 | Duluk et al. | 345/506 |
| 6,529,201 B1 | 3/2003 | Ault et al. | |
| 6,597,357 B1 | 7/2003 | Thomas | |
| 6,603,481 B1 * | 8/2003 | Kawai et al. | 345/505 |
| 6,624,818 B1 * | 9/2003 | Mantor et al. | 345/522 |
| 6,629,188 B1 | 9/2003 | Minkin et al. | |
| 6,631,423 B1 * | 10/2003 | Brown et al. | 719/323 |
| 6,631,463 B1 | 10/2003 | Floyd et al. | |
| 6,657,635 B1 | 12/2003 | Hutchins et al. | |
| 6,658,447 B2 | 12/2003 | Cota-Robles | |
| 6,674,841 B1 | 1/2004 | Johns et al. | |
| 6,700,588 B1 | 3/2004 | MacInnis et al. | |
| 6,715,035 B1 | 3/2004 | Colglazier et al. | |
| 6,732,242 B2 | 5/2004 | Hill et al. | |
| 6,809,732 B2 | 10/2004 | Zatz et al. | |
| 6,812,929 B2 | 11/2004 | Lavelle et al. | |
| 6,825,843 B2 | 11/2004 | Allen et al. | |
| 6,825,848 B1 | 11/2004 | Fu et al. | |
| 6,839,062 B2 | 1/2005 | Aronson et al. | |
| 6,862,027 B2 | 3/2005 | Andrews et al. | |
| 6,891,543 B2 | 5/2005 | Wyatt | |
| 6,915,385 B1 | 7/2005 | Leasure et al. | |
| 6,944,744 B2 | 9/2005 | Ahmed et al. | |
| 6,952,214 B2 | 10/2005 | Naegle et al. | |
| 6,965,982 B2 | 11/2005 | Nemawarkar | |
| 6,975,324 B1 | 12/2005 | Valmiki et al. | |
| 6,976,126 B2 | 12/2005 | Clegg et al. | |
| 6,978,149 B1 | 12/2005 | Morelli et al. | |
| 6,978,457 B1 * | 12/2005 | Johl et al. | 718/100 |
| 6,981,106 B1 | 12/2005 | Bauman et al. | |
| 6,985,151 B1 | 1/2006 | Bastos et al. | |
| 7,015,909 B1 | 3/2006 | Morgan, III et al. | |
| 7,031,330 B1 | 4/2006 | Bianchini, Jr. | |
| 7,032,097 B2 | 4/2006 | Alexander et al. | |
| 7,035,979 B2 | 4/2006 | Azevedo et al. | |
| 7,148,888 B2 | 12/2006 | Huang | |
| 7,151,544 B2 | 12/2006 | Emberling | |
| 7,154,500 B2 | 12/2006 | Heng et al. | |
| 7,159,212 B2 * | 1/2007 | Schenk et al. | 717/153 |
| 7,185,178 B1 | 2/2007 | Barreh et al. | |
| 7,202,872 B2 | 4/2007 | Paltashev et al. | |
| 7,260,677 B1 | 8/2007 | Vartti et al. | |
| 7,305,540 B1 | 12/2007 | Trivedi et al. | |
| 7,321,787 B2 | 1/2008 | Kim | |
| 7,334,110 B1 | 2/2008 | Faanes et al. | |
| 7,369,815 B2 | 5/2008 | Kang et al. | |
| 7,373,478 B2 | 5/2008 | Yamazaki | |
| 7,406,698 B2 * | 7/2008 | Richardson | 719/321 |
| 7,412,570 B2 | 8/2008 | Moll et al. | |
| 7,486,290 B1 | 2/2009 | Kilgariff et al. | |
| 7,487,305 B2 | 2/2009 | Hill et al. | |
| 7,493,452 B2 | 2/2009 | Eichenberger et al. | |
| 7,545,381 B2 | 6/2009 | Huang et al. | |
| 7,564,460 B2 | 7/2009 | Boland et al. | |
| 7,750,913 B1 | 7/2010 | Parenteau et al. | |
| 7,777,748 B2 | 8/2010 | Bakalash et al. | |
| 7,852,341 B1 | 12/2010 | Rouet et al. | |
| 7,869,835 B1 | 1/2011 | Zu | |
| 8,020,169 B2 | 9/2011 | Yamasaki | |
| 2001/0026647 A1 | 10/2001 | Morita | |
| 2002/0116595 A1 | 8/2002 | Morton | |
| 2002/0130874 A1 * | 9/2002 | Baldwin | 345/506 |
| 2002/0144061 A1 | 10/2002 | Faanes et al. | |
| 2002/0194430 A1 | 12/2002 | Cho | |
| 2003/0001847 A1 | 1/2003 | Doyle et al. | |
| 2003/0003943 A1 | 1/2003 | Bajikar | |
| 2003/0014457 A1 | 1/2003 | Desai et al. | |
| 2003/0016217 A1 * | 1/2003 | Vlachos et al. | 345/423 |
| 2003/0016844 A1 | 1/2003 | Numaoka | |
| 2003/0031258 A1 | 2/2003 | Wang et al. | |
| 2003/0067473 A1 | 4/2003 | Taylor et al. | |
| 2003/0172326 A1 | 9/2003 | Coffin, III et al. | |
| 2003/0188118 A1 | 10/2003 | Jackson | |
| 2003/0204673 A1 | 10/2003 | Venkumahanti et al. | |
| 2003/0204680 A1 | 10/2003 | Hardage, Jr. | |
| 2003/0227461 A1 | 12/2003 | Hux et al. | |
| 2004/0012597 A1 | 1/2004 | Zatz et al. | |
| 2004/0073771 A1 | 4/2004 | Chen et al. | |
| 2004/0073773 A1 | 4/2004 | Demjanenko | |
| 2004/0103253 A1 | 5/2004 | Kamei et al. | |
| 2004/0193837 A1 | 9/2004 | Devaney et al. | |
| 2004/0205326 A1 | 10/2004 | Sindagi et al. | |
| 2004/0212730 A1 | 10/2004 | MacInnis et al. | |
| 2004/0215887 A1 | 10/2004 | Starke | |
| 2004/0221117 A1 | 11/2004 | Shelor | |
| 2004/0263519 A1 | 12/2004 | Andrews et al. | |
| 2005/0012759 A1 | 1/2005 | Valmiki et al. | |
| 2005/0024369 A1 | 2/2005 | Xie | |
| 2005/0071722 A1 | 3/2005 | Biles | |

| | | | |
|---|---|---|---|
| 2005/0088448 | A1 | 4/2005 | Hussain et al. |
| 2005/0239518 | A1 | 10/2005 | D'Agostino et al. |
| 2005/0262332 | A1 | 11/2005 | Rappoport et al. |
| 2005/0280652 | A1 | 12/2005 | Hutchins et al. |
| 2006/0020843 | A1 | 1/2006 | Frodsham et al. |
| 2006/0064517 | A1 | 3/2006 | Oliver |
| 2006/0064547 | A1 | 3/2006 | Kottapalli et al. |
| 2006/0103659 | A1 | 5/2006 | Karandikar et al. |
| 2006/0152519 | A1 | 7/2006 | Hutchins et al. |
| 2006/0152520 | A1 | 7/2006 | Gadre et al. |
| 2006/0176308 | A1 | 8/2006 | Karandikar et al. |
| 2006/0176309 | A1 | 8/2006 | Gadre et al. |
| 2007/0076010 | A1 | 4/2007 | Swamy et al. |
| 2007/0130444 | A1 | 6/2007 | Mitu et al. |
| 2007/0285427 | A1 | 12/2007 | Morein et al. |
| 2008/0016327 | A1 | 1/2008 | Menon et al. |
| 2008/0278509 | A1 | 11/2008 | Washizu et al. |
| 2009/0235051 | A1 | 9/2009 | Codrescu et al. |
| 2012/0023149 | A1 | 1/2012 | Kinsman et al. |

FOREIGN PATENT DOCUMENTS

| | | |
|---|---|---|
| JP | H08-077347 | 3/1996 |
| JP | H08-153032 | 6/1996 |
| JP | 08-297605 | 12/1996 |
| JP | 09-287217 | 11/1997 |
| JP | H09-325759 | 12/1997 |
| JP | 10-222476 | 8/1998 |
| JP | 11-190447 | 7/1999 |
| JP | 2000-148695 | 5/2000 |
| JP | 2001-022638 | 1/2001 |
| JP | 2003-178294 | 6/2003 |
| JP | 2004-252990 | 9/2004 |
| KR | 1998-018215 | 8/2000 |
| TW | 413766 | 12/2000 |
| TW | 436710 | 5/2001 |
| TW | 442734 | 6/2001 |

OTHER PUBLICATIONS

"Alpha Testing State"; http://msdn.microsoft.com/library/en-us/directx9_c/directx/graphics/programmingguide/GettingStarted/Direct3Ddevices/States/renderstates/alphatestingstate.asp.*

"Vertex Fog"; http://msdn.microsoft.com/library/en-us/directx9_c/Vertex_fog.asp?frame=true.*

"Anti-aliasing"; http://en.wikipedia.org/wiki/Anti-aliasing.*

Parhami, Computer Arithmetic, Oxford University Press, Jun. 2000, pp. 413-418.

gDEBugger, graphicRemedy, http://www.gremedy.com, Aug. 8, 2006.

Duca et al., A relational Debugging Engine for Graphics Pipeline, International Conference on Computer Graphics and Interactive Techniques, ACM SIGGRAPH 2005, pp. 453-463, ISSN:0730-0301.

Karandikar et al., Patent Application Entitled: "Multidemnsional Datapath Processing in a Video Processor", U.S. Appl. No. 11/267,638, filed Nov. 4, 2005.

Karandikar et al., Patent Application Entitled: "A Latency Tolerant System for Executing Video Processing Operations", U.S. Appl. No. 11/267,875, filed Nov. 4, 2005.

Gadre, S., Patent Application Entitled "Separately Schedulable Condition Codes for a Video Processor", U.S. Appl. No. 11/267,793, filed Nov. 4, 2005.

Lew, et al., Patent Application Entitled "A Programmable DMA Engine for Implementing Memory Transfers for a Video Processor", U.S. Appl. No. 11/267,777, filed Nov. 4, 2005.

Karandikar et al., Patent Application Entitled: "A Pipelined L2 Cache for Memory Transfers for a Video Processor", U.S. Appl. No. 11/267,606, filed Nov. 4, 2005.

Karandikar, et al., Patent Application Entitled: "Command Acceleration in a Video Processor", U.S. Appl. No. 11/267,640, filed Nov. 4, 2005.

Karandikar, et al., Patent Application Entitled "A Configurable SIMD Engine in a Video Processor", U.S. Appl. No. 11/267,393, filed Nov. 4, 2005.

Karandikar, et al., Patent Application Entitled "Context Switching on a Video Processor Having a Scalar Execution Unit and a Vector Execution Unit", U.S. Appl. No. 11/267,778, filed Nov. 4, 2005.

Lew, et al., Patent Application Entitled "Multi Context Execution on a Video Processor", U.S. Appl. No. 11/267,780, filed Nov. 4, 2005.

Su, Z, et al., Patent Application Entitled: "State Machine Control for a Pipelined L2 Cache to Implement Memory Transfers for a Video Processor", U.S. Appl. No. 11/267,119, filed Nov. 4, 2005.

Kozyrakis, "A Media enhanced vector architecture for embedded memory systems," Jul. 1999, http://digitalassets.lib.berkeley.edu/techreports/ucb/text/CSD-99/1059.pdf.

HPL-PD A Parameterized Research Approach—May 31, 2004 http://web.archive.org/web/*/www.trimaran.org/docs/5_hpl-pd.pdf.

Gadre, S., Patent Application Entitled "Stream Processing in a Video Processor", U.S. Appl. No. 11/267,599, filed Nov. 4, 2005.

Gadre, S., Patent Application Entitled "Video Processor Having Scalar and Vector Components With Command FIFO for Passing Function Calls From Scalar to Vector", U.S. Appl. No. 11/267,700, filed Nov. 4, 2005.

Merriam-Webster Dictionary Online; Definition for "program"; retrieved Dec. 14, 2010.

Nvidia Corporation, Technical Brief: Transform and Lighting; dated 1999; month unknown.

Woods J., Nvidia GeForce FX Preview, at http://www.tweak3d.net/reviews/nvidia/nv30preview/1.shtml; dated Nov. 18, 2002; retrieved Jun. 16, 2011.

Intel, Intel Architecture Software Deveopler's Manual, vol. 1: Basic Architecture 1997 p. 8-1.

Intel, Intel Architecture Software Deveopler's Manual, vol. 1: Basic Architecture 1999 p. 8-1, 9-1.

Intel, Intel Pentium III Xeon Processor at 500 and 550Mhz, Feb. 1999.

Free On-Line Dictionary of Computing (FOLDOC), defintion of "video", from foldoc.org/index.cgi?query=video&action=Search, May 23, 2008.

FOLDOC, definition of "frame buffer", from foldoc.org/index.cgi?query=frame+buffer&action=Search, Oct. 3, 1997.

PCreview, article entitled "What is a Motherboard", from www.pcreview.co.uk/articles/Hardware/What_is_a_Motherboard., Nov. 22, 2005.

FOLDOC, definition of "motherboard", from foldoc.org/index.cgi?query=motherboard&action=Search, Aug. 10, 2000.

FOLDOC, definition of "separate compilation", from foldoc.org/index.cgi?query=separate+compilation&action=Search, Feb. 19, 2005.

FOLDOC, definition of "vector processor", http://foldoc.org/, Sep. 11, 2003.

Wikipedia, defintion of "vector processor", http://en.wikipedia.org/, May 14, 2007.

Fisher, Joseph A., Very Long Instruction Word Architecture and the ELI-512, ACM, 1993, pp. 140-150.

FOLDOC, (Free On-Line Dictionary of Computing), defintion of X86, Feb. 27, 2004.

FOLDOC, definition of "superscalar," http://foldoc.org/, Jun. 22, 2009.

FOLDOC, definition of Pentium, Sep. 30, 2003.

Wikipedia, definition of "scalar processor," Apr. 4, 2009.

Intel, Intel MMX Technology at a Glance, Jun. 1997.

Intel, Pentium Processor Family Developer's Manual, 1997, pp. 2-13.

Intel, Pentium processor with MMX Technology at 233Mhz Performance Brief, Jan. 1998, pp. 3 and 8.

Wikipedia, entry p. defining term "SIMD", last modified Mar. 17, 2007.

FOLDOC, Free Online Dictionary of Computing, defintion of SIMD, foldoc.org/index.cgi?query=simd&action=Search, Nov. 4, 1994.

Definition of "queue" from Free on-Line Dictionary of Computing (FOLDOC), http://folddoc.org/index.cgi?query=queue&action=Search, May 15, 2007.

Definition of "first-in first-out" from FOLDOC, http://foldoc.org/index.cgi?query=fifo&action=Search, Dec. 6, 1999.

Definition of "block" from FOLDOC, http://foldoc.org/index.cgi?block, Sep. 23, 2004.

Quinnell, Richard A. "New DSP Architectures Go "Post-Harvard" for Higher Performance and Flexibility" Techonline; posted May 1, 2002.

Wikipedia, definition of Multiplication, accessed from en.wikipedia. org/w/index.php?title=Multiplication&oldid=1890974, published Oct. 13, 2003.

IBM TDB, Device Queue Management, vol. 31 Iss. 10, pp. 45-50, Mar. 1, 1989.

Hamacher, V. Carl et al., Computer Organization, Second Edition, McGraw Hill, 1984, pp. 1-9.

Graham, Susan L. et al., Getting Up to Speed: The future of Supercomputing, the National Academies Press, 2005, glossary.

Rosenberg, Jerry M., Dictionary of Computers, Information Processing & Telecommunications, 2nd Edition, John Wiley & Sons, 1987, pp. 102 and 338.

Rosenberg, Jerry M., Dictionary of Computers, Information Processing & Telecommunications, 2nd Edition, John Wiley & Sons, 1987, pp. 305.

Graf, Rudolf F., Modern Dictionary of Electronics, Howard W. Sams & Company, 1988, pp. 273.

Graf, Rudolf F., Modern Dictionary of Electronics, Howard W. Sams & Company, 1984, pp. 566.

Wikipeida, definition of "subroutine", published Nov. 29, 2003, four pages.

Graston et al. (Software Pipelining Irregular Loops on the TMS320C6000 VLIW DSP Architecture); Proceedings of the ACM SIGPLAN workshop on Languages, compilers and tools for embedded systems; pp. 138-144; Year of Publication: 2001.

SearchStorage.com Definitions, "Pipeline Burst Cache," Jul. 31, 2001, url: http://searchstorage.techtarget.com/sDefinition/0,,sid5_gci214414,00.html.

Heirich; Optimal Automatic Mulit-pass Shader Partitioning by Dynamic Programming; Eurographics—Graphics Hardware (2005); Jul. 2005.

Hutchins E., SC10: A Video Processor and Pixel-Shading GPU for Handheld Devices; presented at the Hot Chips conferences on Aug. 23rd, 2004.

Wilson D., Nvidia's Tiny 90nm G71 and G73: GeForce 7900 and 7600 Debut; at http://www.anandtech.com/show/1967/2; dated Sep. 3, 2006, retrieved Jun. 16, 2011.

Defintion of "Slot," http://www.thefreedictionary.com/slot, Oct. 2, 2012.

Korean Intellectual Property Office; English Abstract for Publication No. 100262453, corresponding to application 1019970034995, 2001.

Espasa R et al: "Decoupled vector architectures", High-Performance Computer Architecture, 1996. Proceedings., Second International Symposium on San Jose, CA, USA Feb. 3-7, 1996, Los Alamitos, CA, USA, IEEE Comput. Soc, US, Feb. 3, 1996, pp. 281-290, XPO1 0162067, DOI: 10.11 09/HPCA.1996.501193 ISBN: 978-0-8186-7237-8).

* cited by examiner

FIGURE 5

VALIDATING A GRAPHICS PIPELINE USING PRE-DETERMINED SCHEDULES

FIELD OF THE INVENTION

The present invention relates to the field of computer video graphics. Specifically, embodiments of the present invention relate to scheduling graphics operations in a graphics pipeline.

BACKGROUND ART

Figure 1:
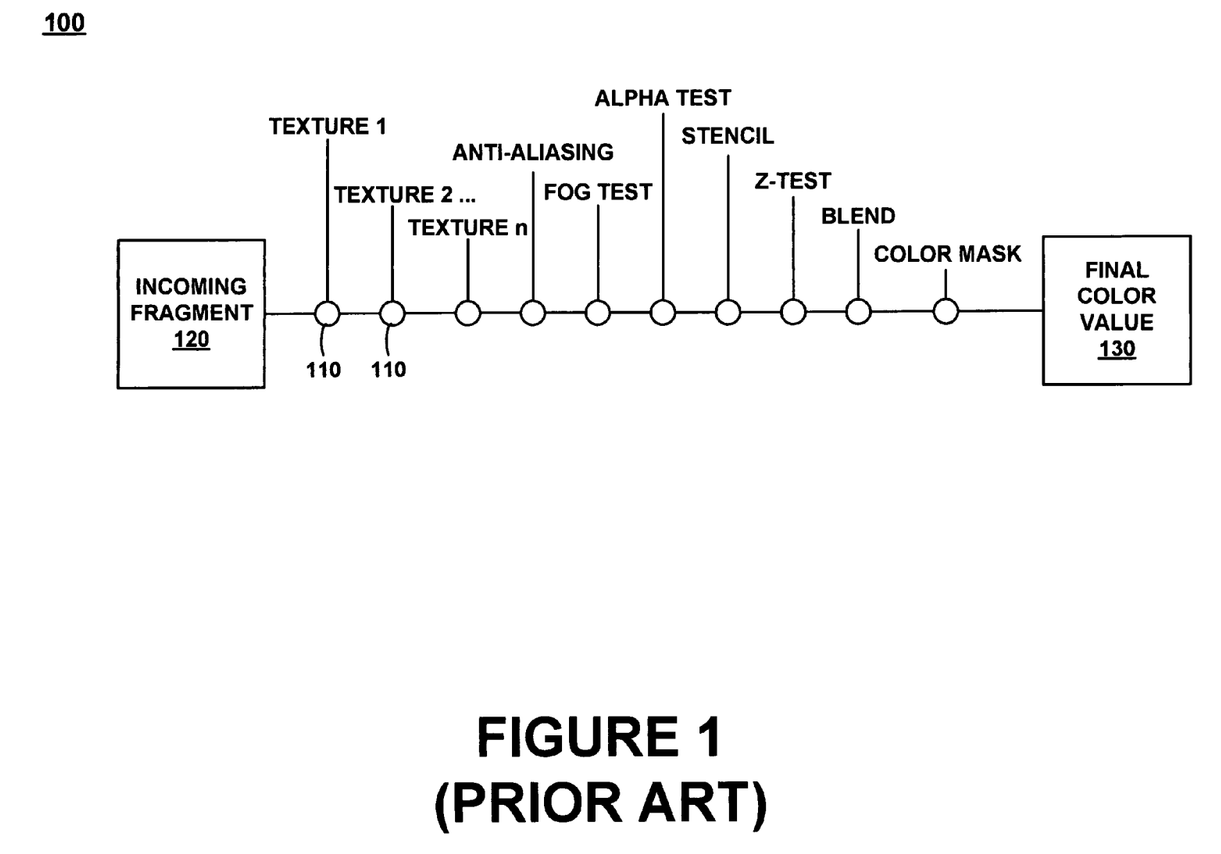
FIG. 1 is a state diagram in accordance with the prior art.

FIG. 1 illustrates a conventional OpenGL state diagram 100 concerned with processing fragments in graphics processing pipeline. The state diagram 100 comprises a number of rendering operations 110 indicating potential operations to be performed on an incoming fragment 120. Conventionally, a host system may set the state via one or more OpenGL calls. For example, the host system may "turn on" fog by enabling the fog operation. Consequently, the graphics pipeline is directed to apply fog to all fragments processed in the graphics processing pipeline until the fog operation is disabled by the host system. The state diagram 100 in FIG. 1 is exemplary and does not reflect all possible state variables. Furthermore, the OpenGL specification is one example of a graphics specification concerned with rendering.

The incoming fragment 120 has a color associated with it that is modified by a graphics pipeline that processes the fragment to implement whatever rendering operations 110 are "enabled" in the current state. For example, if the "fog" operation is enabled, then the graphics pipeline performs a fog operation on any fragments that are processed while the fog operation is still enabled. A final color value 130 for the fragment is arrived at after applying the rendering operations 110.

While some state variables may be "enabled" or "disabled," there may also be "mode" and "value" state variables. An example of a mode state variable is blending, which allows a particular type of blending to be selected. An example of a value state variable is color. For example, color may be specified by a command that specifies a value between 0 and 1 for each of red, green, blue.

In order to render the fragments in accordance with the current state specified by the host system, hardware in a graphics processing pipeline can be programmed to reflect the current state. The process of determining suitable instructions for programming hardware in a graphics processing pipeline to reflect the current state is referred to as "validating" or performing validation.

Therefore, it would be advantageous to provide a method and device that validates an integrated circuit graphics pipeline. It would be further advantageous if the method and device efficiently determines a schedule of instructions to program the integrated circuit graphics pipeline, based on a current OpenGL state.

SUMMARY OF THE INVENTION

Embodiments of the present invention provide a method and device that validate an integrated circuit graphics pipeline. Embodiments of the present invention provide a method and device that efficiently determine a schedule of instructions to program the integrated circuit graphics pipeline, based on a graphics state of a host. The present invention provides these advantages and others not specifically mentioned above but described in the sections to follow.

A method of scheduling graphics operations is disclosed. One embodiment is a computer readable medium having stored thereon instructions for implementing a method of determining a schedule of instructions for an integrated circuit graphics pipeline. The method includes accessing a graphics state of a host system. The graphics state comprises operations to be performed on fragments to be processed by the graphics pipeline. The method further includes determining a vector based on the graphics state and indexing a memory-resident table based on the vector to obtain a predetermined listing and ordering of macro-operations. The method still further includes determining instructions for programming the graphics pipeline based on executing modules in accordance with the order specified by the obtained predetermined listing and ordering of macro-operations.

In one embodiment, the instructions that are generated program an arithmetic logic unit of the graphics pipeline. In another embodiment, the instructions are also used to program a data fetch unit of the pipeline. Other pipeline modules could also be programmed according to instructions generated in the embodiments described herein.

Another embodiment in accordance with the present invention is a computer-readable medium having stored thereon a device driver. The device driver includes an indexable data structure comprising entries corresponding to states of a host device. The states specify how fragments are to be processed in a graphics pipeline. The entries comprise a predetermined listing and ordering of operations for implementing a given one of the states. The device driver has a first program code operable to access a vector based on a current state of the host system and to index the data structure based on the vector to determine a schedule of macro-operations for the state. The device driver has a second program code operable to access the schedule of macro-operations for the state and to determine hardware instructions by executing portions of the second program code based on the accessed schedule of macro-operations.

The vector may be determined according to the enable states of a plurality of graphics functions that are contained within the host's graphic state. Once a particular vector is determined, the corresponding entry in the table identifies a pre-determined schedule of macro-operations that has been determined to provide an efficient and effective manner in which to program the pipeline to implement the host state.

By pre-determining a schedule of instruction generation for each possible permutation of graphics enabled functions, the scheduler of the present invention is significantly relieved in complexity and length, thereby providing a better schedule for portable and low power applications.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION OF THE INVENTION

In the following detailed description of the present invention, validating an integrated circuit graphics pipeline, numerous specific details are set forth in order to provide a thorough understanding of the present invention. However, it will be recognized by one skilled in the art that the present invention may be practiced without these specific details or with equivalents thereof. In other instances, well-known methods, procedures, components, and circuits have not been described in detail as not to unnecessarily obscure aspects of the present invention.

NOTATION AND NOMENCLATURE

Some portions of the detailed descriptions that follow are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "requesting" or "allocating" or "computing" or "transferring" or "calculating" or "determining" or "receiving" or "executing" or "accessing" or "generating" or "storing" or "indexing" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention perform a validation process by generating instructions for use in programming hardware in a graphics processing pipeline such that the graphics processing pipeline implements a current graphics state specified by a host system. Embodiments of the present invention are well-suited to perform validation in connection with a graphics specification that is substantially compliant with the OpenGL specification. However, the present invention is not limited to the validation involving OpenGL.

Throughout this description, the term "graphics specification" includes any specification that may be used to define a rendering state. In one embodiment, the instruction scheduling techniques and processes described herein may be implemented within a device driver associated with a graphics pipeline.

The rendering state or graphics state, as specified by a host device making calls that are compliant with a graphics specification, may comprise one or more operations to be performed on one or more fragments. For example, the rendering state may indicate that "blend" and "fog" operations are to be performed on each fragment that is processed in the graphics processing pipeline. The rendering state may be changed at the discretion of, for example, an application program such as a video game executing in the host device. When the rendering state is changed, embodiments of the present invention may re-program the graphics pipeline hardware, if necessary, by determining a new schedule of hardware instructions. Moreover, embodiments of the present invention determine the schedule of instructions efficiently and with a relatively small scheduling code and memory resources. Rendering state may involve, but is not limited to, the following graphics functions: multiple textures, antialiasing, fog, alpha test, stencil, z-test, blend, and color mask.

Within the LUT are entries that correspond to every permutation that the rendering state can have. Each state therefore has a custom and pre-determined schedule of macro-operations, which identify an order to execute software modules to generate the graphics pipeline instructions Embodiments of the present invention utilize a look-up table (LUT) that comprises a distinct schedule for different rendering states, such that hardware may be programmed based on one of the schedules. The schedules in the LUT are not necessarily the hardware instructions themselves, but may serve as an intermediary in the determination of hardware instructions. For each rendering state, a hardware instruction sequence is a function of the hardware parameters, and applying optimizations and exceptions to that sequence. Therefore, the determination of a hardware instruction sequence is a complex process.

In some cases, an operation in a rendering state maps directly to a corresponding hardware instruction. In other cases, a single rendering operation in the rendering state may be implemented by multiple hardware instructions. In still other cases, multiple rendering operations may be optimally performed by a single hardware instruction. The latter case is particularly desirable as minimizing the number of instructions generally results in faster graphics rendering performance.

Because embodiments of the present invention use a LUT to aid scheduling hardware instructions in a graphics pipeline, computation time is saved when rendering is taking place. For example, the scheduling information in the LUT can be determined "offline" by examining factors related to the rendering states such as the presence (or absence) of a blending operation, first texture, second texture, fog, etc. The total number of permutations of these factors may be in the hundreds. However, the LUT of scheduling information is very compact.

Run-time information in addition to the scheduling information in the LUT may be used to determine the actual hardware instructions used to program the graphics pipeline. However, there is no need to determine the order of instructions and perform optimization, as these functions have been performed "offline" with the results included in the LUT.

Exemplary Computer System Platforms

Figure 2A:
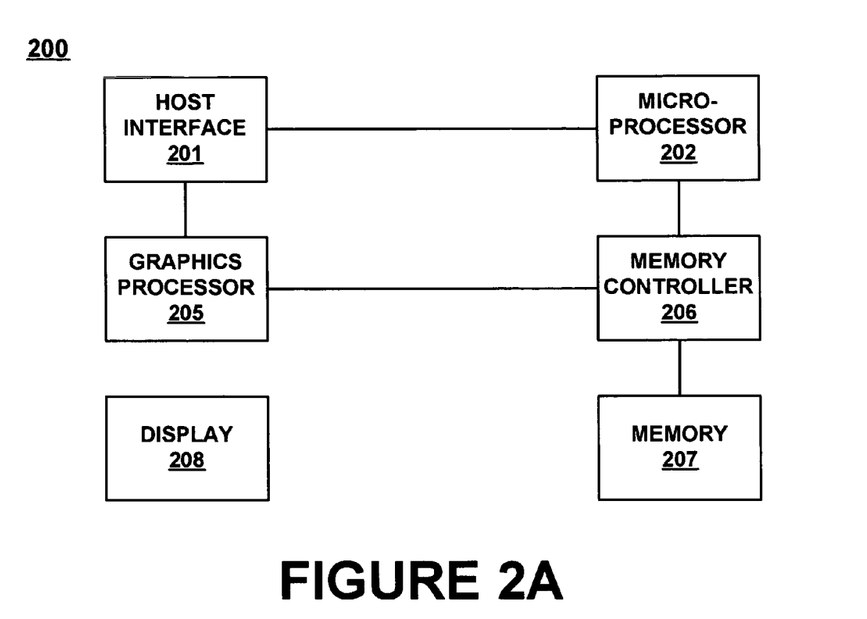
FIG. 2A is a block diagram of one example of a system upon which embodiments in accordance with the present invention may be implemented.

FIG. 2A is a block diagram of a system 200 upon which embodiments in accordance with the present invention may be implemented. For example, embodiments of the present invention may be implemented as a device driver within system 200. System 200 shows the components of an execution platform for implementing certain software-based functionality of embodiments in accordance with the present invention. As depicted in FIG. 2A, the system 200 includes a microprocessor 202 coupled to a graphics processor 205 via a host interface 201. The host interface 201 translates data and commands passing between the microprocessor 202 and the graphics processor 205 into their respective formats. Both the microprocessor 202 and the graphics processor 205 are coupled to a memory 207 via a memory controller 206. In the system 200 embodiment, the memory 207 is a shared memory, whereby the memory 207 stores instructions and data for both the microprocessor 202 and the graphics processor 205. Access to the shared memory 207 is through the memory controller 206. The shared memory 206 also includes a video frame buffer for storing pixel data that drives a coupled display 208.

As described above, certain processes and steps of the present invention are realized, in one embodiment, as a series of instructions (e.g., a software program) that reside within computer-readable memory (e.g., memory 207) of a computer system (e.g., system 200) and are executed by the microprocessor 202 and graphics processor 205 of system 200. When executed, the instructions cause the system 200 to implement the functionality of embodiments of the present invention as described below.

As shown in FIG. 2A, system 200 includes basic components of a computer system platform that implements functionality of embodiments of the present invention. Accordingly, system 200 can be implemented as, for example, a number of different types of portable handheld electronic devices. Such devices can include, for example, portable phones, personal digital assistants (PDAs), handheld gaming devices, or virtually any other type of device with display capability where there is an interest in rendering three-dimensional graphical images at low cost and low power. In such embodiments, components would be included that are designed to add peripheral buses, specialized communications components, support for specialized input/output (I/O) devices, and the like.

Additionally, it should be appreciated that although the components of FIG. 2A are depicted as discrete components, several of the components can be implemented as a single integrated circuit device (e.g., a single integrated circuit die) configured to take advantage of the high levels of integration provided by modern semiconductor fabrication processes. For example, in one embodiment, the microprocessor 202, host interface 201, graphics processor 205, and memory controller 206 are fabricated as a single integrated circuit die.

Figure 2B:
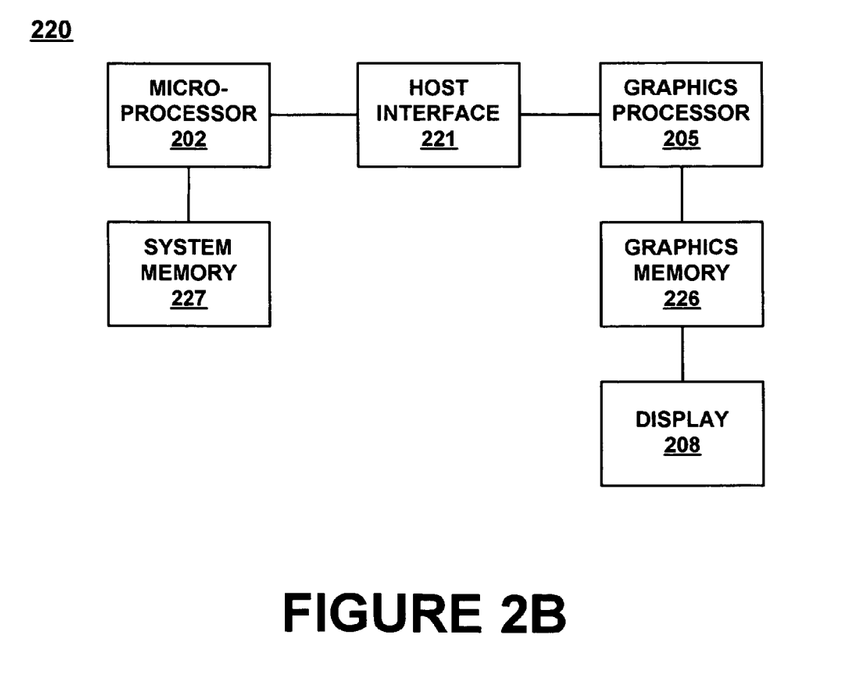
FIG. 2B is a block diagram of another example of a system upon which embodiments in accordance with the present invention may be implemented.

FIG. 2B shows a system 220 in accordance with an alternative embodiment of the present invention. System 220 is substantially similar to system 200 of FIG. 2A. System 220, however, utilizes a microprocessor 202 having a dedicated system memory 227, and a graphics processor 205 having a dedicated graphics memory 226. In the system 220 embodiment, the system memory 227 stores instructions and data for processes/threads executing on the microprocessor 202, and graphics memory 226 stores instructions and data for those processes/threads executing on the graphics processor 205. The graphics memory 226 stores pixel data in a frame buffer that drives the display 208. As with computer system 220 of FIG. 2A, one or more of the components of system 220 can be integrated as a single integrated circuit die.

Exemplary Programmable Graphics Pipeline

Figure 3:
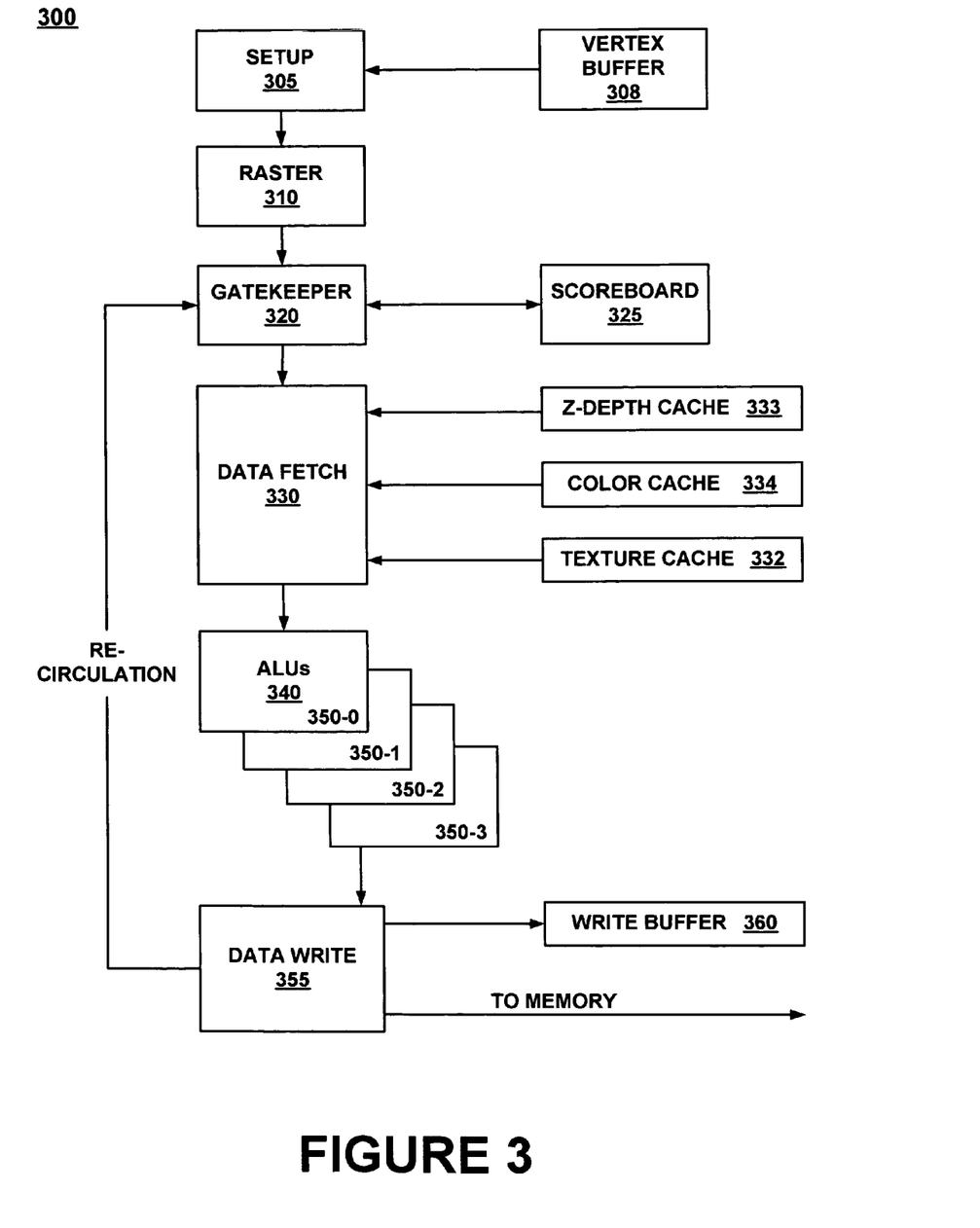
FIG. 3 is a block diagram of an exemplary pipeline architecture, for which embodiments of the present invention are suitable to determine a schedule of hardware instructions.

FIG. 3 is a block diagram of an exemplary programmable graphics pipeline 300 for which embodiments of the present invention develop a schedule of hardware instructions to implement a graphics rendering state. It will be understood that embodiments of the present invention are well-suited to determine a schedule of hardware instructions for other graphics pipelines. The pipeline 300 includes a setup stage 305, a raster stage 310, a gatekeeper stage 320, a data fetch stage 330, an Arithmetic Logic Unit (ALU) stage 340, and a data write stage 355.

Setup stage 305 of FIG. 3 receives instructions and graphics primitives from a host, such as a software application running on system 200 or 250 of FIGS. 2A and 2B, respectively. In general, setup stage 305 calculates vertex parameters needed by raster stage 310. In one embodiment, setup stage 305 performs functions associated with the geometrical 3D to 2D transformation of coordinates, clipping, and setup. The setup stage 305 takes vertex information (e.g., x, y, z, color and/or texture attributes, etc.) and applies a user-defined view transform to calculate screen space coordinates for each geometrical primitive (hereinafter described as triangles because primitives are typically implemented as triangles), which are then sent to the raster stage 310 to draw a given triangle. A vertex buffer 308 may be included to provide a buffer for vertex data used by setup stage 305.

In general, raster stage 310 translates triangles to pixels using interpolation. Raster stage 310 receives data from setup stage 305 regarding triangles that are to be rendered (e.g., converted into pixels). Raster stage 310 determines which pixels correspond to which triangle, processes each pixel of a given triangle including computation of parameters associated with each pixel, and determines shader processing operations that need to be performed on a pixel as part of the rendering, such as color, texture, and fog operations.

Raster stage 310 generates a "pixel packet" for each pixel of a triangle that is to be processed. A pixel packet is, in general, a set of descriptions used for calculating an instance of a pixel value for a pixel in a frame of a graphical display. A pixel packet is associated with each pixel in each frame. Each pixel is associated with a particular (x,y) location in screen coordinates.

Each pixel packet includes a payload of pixel attributes required for processing (e.g., color, texture, depth, fog, and [x,y] location, etc.) and sideband information (pixel attribute data is provided by the data fetch stage 330). In one embodiment, the sideband information includes a kill bit. If the kill bit is set somewhere in the pipeline 300, then the pixel packet will proceed through the remainder of the pipeline 300 without active processing. A pixel packet may contain one row of data or may contain multiple rows of data. A row is generally the width of the pipeline bus.

In one embodiment, raster stage 310 of FIG. 3 calculates barycentric coordinates for each pixel packet. The use of barycentric coordinates improves dynamic range, which permits using fixed-point calculations that require less power than floating point calculations.

As each pixel of a triangle is walked through raster stage 310, raster stage 310 generates pixel packets for further processing which are received by gatekeeper stage 320. Gatekeeper stage 320 performs a data flow control function. In one embodiment, gatekeeper stage 320 has an associated scoreboard 325 for scheduling, load balancing, resource allocation, and hazard avoidance of pixel packets, as well as circulation. Scoreboard 325 tracks the entry and retirement of pixels. Pixel packets entering gatekeeper stage 320 set the scoreboard 325, and the scoreboard 325 is reset as the pixel packets drain out of pipeline 300.

Gatekeeper 320 and scoreboard 325 provide several benefits. Scoreboard 325 can track pixel packets that are capable of being processed by ALUs 350, along with those pixel packets that have their kill bit set. For example, if there are no valid pixel packets, the ALU pipe stages may be turned off, for example, not clocked, to save power.

A data fetch stage 330 fetches data for pixel packets passed on by gatekeeper 320. Such data may include color information, any depth information, and any texture information for each pixel packet. In one embodiment, data fetch stage 330 also manages a local z-depth cache 333, local texture/fog cache 332, and a color cache 334. Color cache 334 may be used for alpha blending. Fetched data is placed into an appropriate field in the pixel packet prior to sending the pixel packet on to the next stage.

From the data fetch stage 330, pixel packets enter an ALU stage 340. In one embodiment, the ALU stage 340 includes multiple ALUs 350 configured to execute shader programming related to three-dimensional graphics operations such as, but not limited to, texture combine (texture environment), stencil, fog, alpha blend, alpha test, and depth test.

In the example of FIG. 3, there are four (4) ALUs 350-0, 350-1, 350-2, and 350-3. The ALUs may be series coupled scalar units. While four ALUs 350 are illustrated, in other implementations, ALU stage 340 may incorporate a different number of ALUs 350.

Each ALU 350-0, 350-1, 350-2, and 350-3 executes an instruction, each instruction for performing an arithmetic operation on operands that correspond to the contents of the pixel packets. An ALU can use temporarily stored values from previous operations.

Continuing with reference to FIG. 3, an example of an arithmetic operation performed by ALUs 350-0, 350-1, 350-2, and 350-3 is a scalar arithmetic operation of the form $(a*b)+(c*d)$, where a, b, c, and d are operand values that are obtained from a pixel packet. Each ALU 350-0, 350-1, 350-2, and 350-3 can perform other mathematical operations.

Each ALU 350-0, 350-1, 350-2, and 350-3 of FIG. 3 may determine whether to generate a kill bit based on a test, such as a comparison of $a*b$ and $c*d$ (e.g., kill if $a*b$ not equal to $c*d$). An individual ALU 350-0, 350-1, 350-2, and 350-3 can be disabled, for example, not clocked, with regard to processing a pixel packet if the kill bit is set in a pixel packet. A clock-gating mechanism may be used to disable ALU 350-0, 350-1, 350-2 or 350-3 when a kill bit is detected in any row of a pixel packet. As a result, after a kill bit is generated for a row of a pixel packet, the ALUs 350-0, 350-1, 350-2, and 350-3 do not waste power on the row of the pixel packet as it propagates through ALU stage 340. However, note that a pixel packet with a kill bit set still propagates onwards, permitting it to be accounted for by data write stage 355 and scoreboard 325. This permits all pixel packets to be accounted for by scoreboard 325, even those pixel packets marked by a kill bit. A kill bit refers to a pixel packet associated with a pixel that is not to be rendered on the screen.

The output of the ALU stage 340 goes to the data write stage 355. The data write stage 355 stores pipeline results in a write buffer 360 or in a frame buffer in memory (e.g., memory 207 of FIG. 2A or memory 226 of FIG. 2B). Data write stage 355 indicates retired writes to gatekeeper stage 320 for scoreboarding. Optionally, pixel packets/data can be re-circulated from the data write stage back to the gatekeeper 320 if further processing of the data is needed.

Exemplary Macro-Operations

Table I includes a list of exemplary macro-operations that relate to programming an ALU and a general description of the manner in which the graphics pipeline hardware should be programmed to effect each macro-operation, in accordance with an embodiment of the present invention. Table I does not describe specific details of programming the hardware. It will be understood that the macro-operations are not the actual hardware instructions. Rather, the macro-instructions define an ordered list of operations from which the actual hardware instructions are generated. Further, a single macro-operation may be implemented with more than one hardware instruction.

In Table I, the first macro-operation is defined as un-used or invalid. The second macro-operation is implemented by programming the hardware to kill a pixel without writing the pixel data to a frame buffer or the like. As discussed above, killing a pixel can be achieved by not clocking the hardware such that the payload associated with the pixel packet is not propagated through the hardware. Thus, killing a pixel saves power. The third macro-operation is used when the hardware is to be programmed to pass a pixel packet without processing. When passing a pixel without processing, the hardware is clocked such that the payload associated with the pixel packet is propagated through the hardware. Several macro-operations are provided to indicate the hardware is to be programmed to apply a texture. In the example of Table I, there are five texture units that may be used. Other exemplary macro-operations in Table I specify that the hardware should be programmed to perform fog, blending, and/or alpha operations.

Some of the macro-operations relate to multiple rendering operations in the state of the graphics specification. For example, one macro-operation combines a "fog" and an "alpha test" operation. Another macro-operation combines a "blend" and a "color mask" operation. The exemplary macro-operations are well-suited for use in the process of validating a graphics pipeline such as the exemplary graphics pipeline depicted in FIG. 3. However, the exemplary macro-operations are not limited to validating the exemplary graphics pipeline of FIG. 3. Further, macro-operations may be used to specify the programming of hardware other than an ALU, such as a data fetch unit in a graphics pipeline. Further, embodiments of the present invention are not limited to the macro-operations described in Table I.

TABLE I

| Macro-operation | Description |
| --- | --- |
| ALU_OP_UNUSED = 0 | ALU instruction is unused/invalid |
| ALU_OP_KILL | Kill pixel and write no results |
| ALU_OP_PASSTHRU | Pass-through |
| ALU_OP_TEX0 | Texenv function on texture unit 0 |
| ALU_OP_TEX1 | Texenv function on texture unit 1 |
| ALU_OP_TEX2 | Texenv function on texture unit 2 |
| ALU_OP_TEX3 | Texenv function on texture unit 3 |
| ALU_OP_TEX4 | Texenv function on texture unit 4 |
| ALU_OP_FOG | Fog |
| ALU_OP_FOG_ALPHA | Fog + alpha test |
| ALU_OP_ALPHA_FUNC | Alpha testing |
| ALU_OP_BLEND_MASK | Blend and/or color mask |
| ALU_OP_LOGICOP | Logic op |

Exemplary Macro-Operation Schedules

Table II illustrates exemplary pre-determined macro-operation schedules using the exemplary macro-operations described in Table I, in accordance with an embodiment of the present invention. Each schedule is for a respective rendering state, for example, an active OpenGL rendering state. The first column in Table II represents an encoded version of the schedule. The second column lists "enable" states in OpenGL that affect rendering. The third column lists a schedule of macro-operations corresponding to the OpenGL state in the same row. The fourth column provides comments and explanations. It will be understood that implementations of the LUT store only the encoded schedule, as depicted in the first column. Thus, while referring to the LUT as "storing pre-determined macro-operation schedules," it will be understood that the LUT may actually store an identifier of a macro-operation. In practice, the LUT may contain many more entries than depicted in Table II.

While the example in Table II contemplates OpenGL, the present invention is not limited to OpenGL. Furthermore, while examples herein refer to "enable" states, the present invention is not limited to "enable" state variables. For example, the states that affect rendering may be any state variable including, for example, "mode" and "value" state variables.

The encoded schedule of macro-operations is stored in a look-up table. As an illustrative example, the second entry in Table II corresponds to an OpenGL state in which the following operations are enabled: "texture_0," "blend," and "fog". In this case, three macro-operations are scheduled, in the order specified in Table II. The order can be determined in any suitable fashion. The present invention is not limited to the particular order in which macro-operations are specified in Table II. In this example, the schedule "00000002"h is read from right to left and each hexadecimal value represents a macro-operation to be performed and the order specified. For example, the value "2" indicates a "pass-through macro-operation." The schedule "00000B83" indicates that macro-operations identified by "B", "3", and "8" should be implemented. The schedule is input by scheduling code, which generates appropriate hardware instructions, based on the ordered list of macro-operations, in accordance with embodiments of the present invention.

The third entry in Table II is an example in which multiple ALU passes are performed, which reflects the nature of the underlying hardware that is being validated this embodiment. In this example, the graphics hardware being validated re-circulates a pixel packet such that there multiple ALU passes in order to perform more than four operations on a fragment associated with the pixel packet. For example, a pixel packet is re-circulated as indicated in FIG. 3 from the data write stage 355 to the gatekeeper stage 320. In this case, the five rendering operations in the OpenGL state leads to five ALU instructions, which are performed in two passes. However, there are six macro-operations as a "pass-through" macro-operation is added at the start of the second pass through the ALU. The present invention is well-suited for hardware with other characteristics.

The fourth entry provides an example in which two of the OpenGL rendering operations correspond to a single macro-operation. For example, a single macro-operation "fog_alpha" can be used for the "fog" and "alpha_test" enable in the OpenGL state. Thus, a total of four OpenGL enables correspond to a total of three macro-operations, in this case. Moreover, the ALU can be programmed with a single instruction to perform both the fog and alpha operations. Thus, the pre-determined macro-operation schedule is optimized to take advantage of the capability of the ALU.

The fifth entry in Table II provides an example in which a single OpenGL enable expands to multiple macro-operations. For example, a macro-operation of "passthru" is added before an alpha test followed by a blend. This allows the hardware to be programmed such that ALU registers are properly loaded for the blending operation.

The final entry in Table II illustrates a case in which nine OpenGL enables are implemented with seven macro-operations, plus a pass-through macro-operation. As discussed previously, breaking the macro-operations into two passes reflects the nature of underlying hardware; embodiments of the present invention are well-suited to validate other hardware.

TABLE II

| Schedule (encoded) | Active OpenGL state affecting pixel rendering | Macro-op schedule ("ALU_OP_" prefix omitted) | Comments/explanation |
|---|---|---|---|
| 00000002h | (default) | PASSTHRU | Baseline case: vertex color only |
| 00000B83h | GL_TEXTURE_0, GL_BLEND, GL_FOG | TEX0, FOG, BLEND_MASK | Multiple enables/operations: 1 texture + fog + blending |
| 00B82543h | GL_TEXTURE0, GL_TEXTURE1, GL_TEXTURE2, GL_BLEND, GL_FOG | TEX0, TEX1, TEX2, PASSTHRU, FOG, BLEND_MASK | Multiple ALU passes ("recirculation") when programming more than 4 operations: 5 "enables" → 5 ALU instructions → 2 "passes" 6 macro-ops; 1$^{st}$ operation of 2$^{nd}$ "pass" is a pass-through |
| 00000B93h | GL_TEXTURE0, GL_BLEND, GL_FOG, GL_ALPHA_TEST | TEX0, FOG_ALPHA, BLEND_MASK | Combining multiple OpenGL enables into a single macro-op (and ALU instruction): fog + alpha test → FOG_ALPHA |
| 00000BA2h | GL_BLEND, GL_ALPHA_TEST | PASSTHRU, ALPHA, BLEND_MASK | Single OpenGL enable expands to multiple instructions/macro-ops: alpha test followed by blend is preceded by a pass-through to load up ALU registers for blending. |
| B9726543h | GL_TEXTURE_0, GL_TEXTURE_1, GL_TEXTURE_2, GL_TEXTURE_3, | TEX0, TEX1, TEX2, TEX3, PASSTHRU, TEX4, | 9 OpenGL enables implemented using 7 macro-ops (not counting PASSTHRU) in a 2-pass 4 + 4 |

TABLE II-continued

| Schedule (encoded) | Active OpenGL state affecting pixel rendering | Macro-op schedule ("ALU_OP_" prefix omitted) | Comments/explanation |
|---|---|---|---|
| | GL_LINE_SMOOTH, GL_BLEND, GL_FOG, GL_ALPHA_TEST, glColorMask | FOG_ALPHA, BLEND_MASK | schedule; fog + alpha test implemented using FOG_ALPHA macro-op, blending + color mask implemented using BLEND_MASK macro-op |

Figure 4:
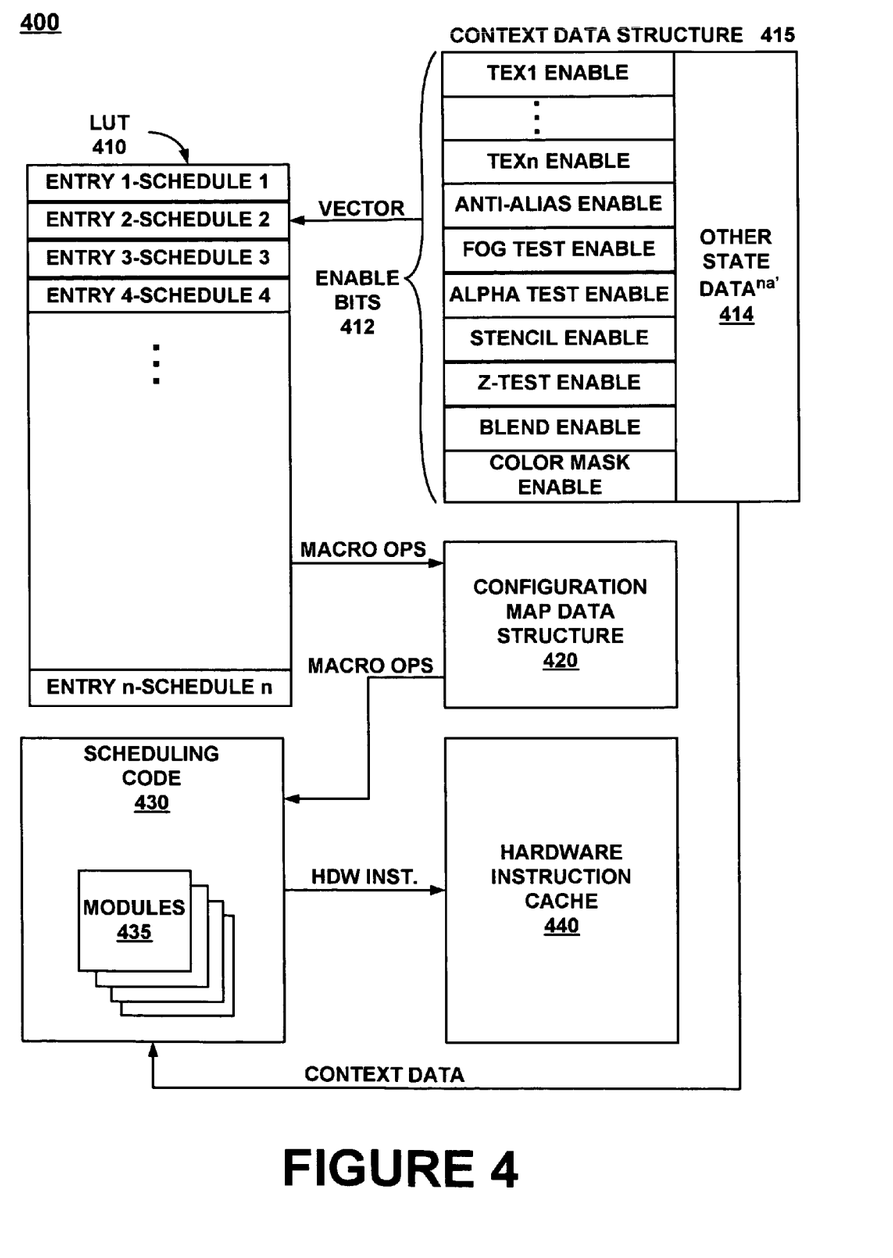
FIG. 4 is a diagram illustrating exemplary components in a device driver used in the generation of instructions for programming a graphics pipeline in accordance with one embodiment of the present invention

FIG. 4 is a diagram illustrating software elements in a device driver 400 used in the generation of a schedule of instructions for programming a graphics pipeline, in accordance with an embodiment of the present invention. The various elements of the device driver 400 may be stored in computer-readable medium. The device driver 400 may be implemented within a system such as system 200 or 250 depicted in FIGS. 2A and 2B, respectively. However, the device driver is not so limited. The look-up table (LUT) 410 comprises a plurality of entries, each of which describes a schedule of macro-operations and refers to a respective rendering state. The schedule may be encoded as depicted in the "encoded schedule" column of Table II. Each entry in the LUT 410 defines a sequence of macro-operations for a given state of a host system. The LUT 410 has sufficient entries to cover all states of interest. For example, the LUT 410 has sufficient entries to cover all states that affect the programming of the graphics pipeline hardware.

The context data structure 415 may be built by the device driver 400 based on information from a host device. For example, the device driver 400 builds and updates the context data structure 415 in response to OpenGL calls or the like. The context data structure 415 may include information that was not obtained from the host device, if desired. The context data structure 415 includes various enable bits 412, which define whether the corresponding rendering operation is enabled. The vector that is used to index the LUT 410 is formed from at least some of the enable bits, in accordance with this embodiment. it is not required that all enable bits be used to form the vector. The context data structure 415 also includes other state data 414, which is not used to form the vector, in this embodiment. However, it will be understood that the vector may be formed in any suitable fashion from whatever information in the context data structure 415 or elsewhere that is deemed relevant to validate the graphics pipeline using well-known techniques.

The vector that is generated based on state information is used to index the LUT 410, thus determining a sequence of macro-operations for that state. The macro-operations for the entry pointed to by the vector are transferred to and stored in the configuration map data structure 420 by writing the encoded schedule into the configuration map data structure 420. The configuration map data structure 420 is updated whenever the state in the context data structure 415 changes in a way that affects the scheduling of macro-operations.

The scheduling code 430 is used to determine instructions for the hardware. The scheduling code 430 accesses the configuration map data structure 420 to input the encoded schedule. Thus, the scheduling code 430 effectively inputs a list of macro-operations and the order in which they should be performed to implement the current state. The list of macro-operations by itself does not necessarily contain all of the information to program the graphics pipeline. For example, a macro-operation may define that a blend operation should be performed. However, additional "context" information may be accessed to determine whether a "multiply" or an "add" should be executed when performing the blend operation. The scheduling code 430 may thus input context information. The context information may be derived from, for example, the other state data 414 in the context data structure 415. As another example, the context data may identify a particular texture map for a texture macro-operation.

Based on the schedule of macro-operations and possibly context information, the scheduling code 430 executes portions of the scheduling code and outputs one or more hardware instructions, which are stored in the hardware instruction cache 440. The hardware instructions may then be used to program a graphics pipeline to implement the graphics state. For example, an ALU (FIG. 3, 340) and data fetch unit (FIG. 3, 330) may be programmed via the hardware instructions.

The scheduling code 430 may have various modules 435 that are executed to determine the hardware instructions, based on the encoded schedule of macro-operations. For example, there may be a texture module, an alpha test module, a fog module an anti-alias module, a depth test module, a color mask module, etc. The scheduling code 430 may execute the fog module if the accessed schedule of macro-operations includes a fog macro-operation, for example. In some embodiments, the listing and ordering of macro-operations in the LUT corresponds to these modules. As such, the modules are executed according to the ordering in the LUT, wherein the executing generates instructions for programming the graphics pipeline to implement said state. As used herein, the phrase "executing the macro-operations in the scheduled order" means executing scheduling software based on one of the encoded schedules of macro-operations from the LUT.

Figure 5:
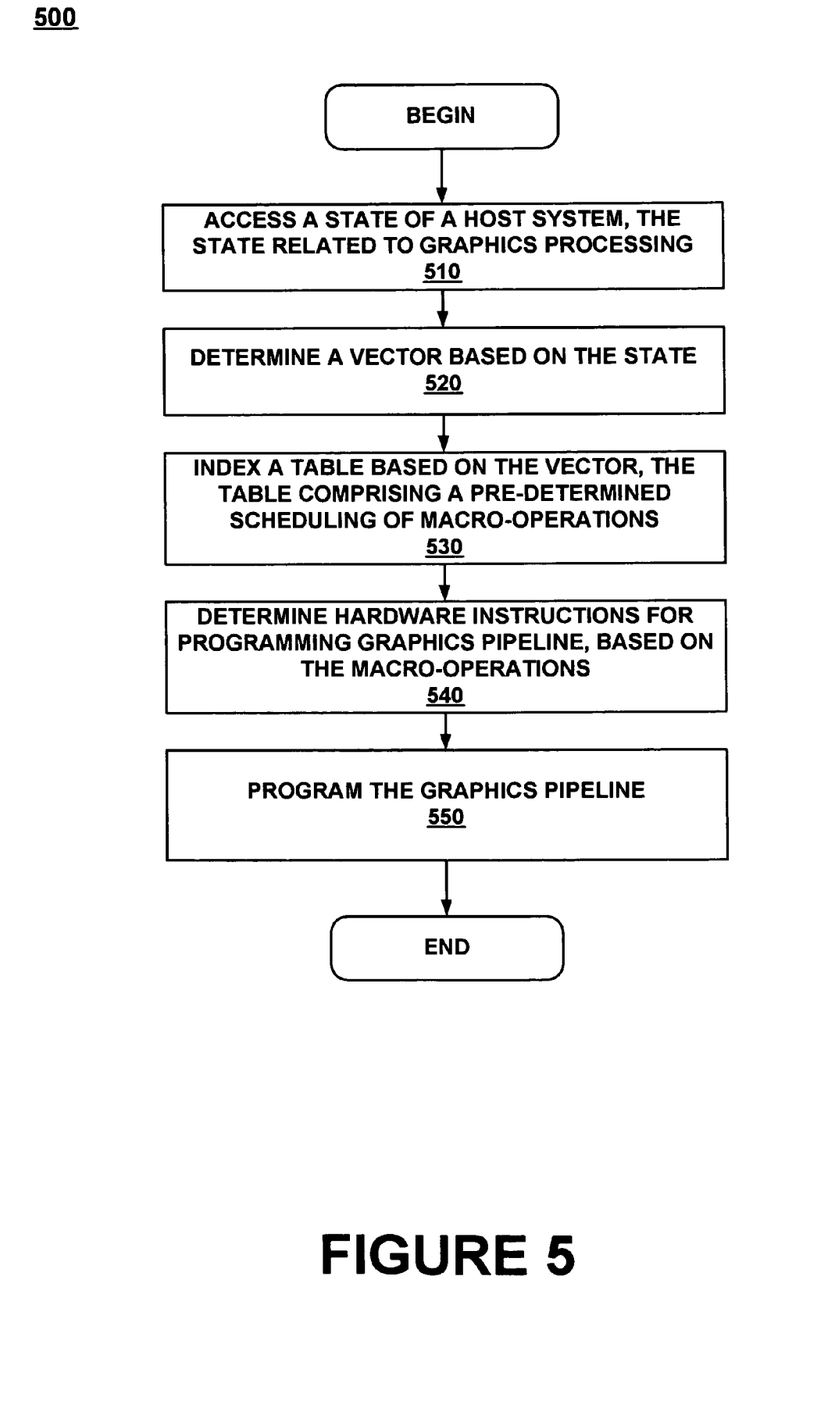
FIG. 5 is a flowchart illustrating an exemplary process of scheduling instructions in a graphics pipeline, in accordance with an embodiment of the present invention.

FIG. 5 is a flowchart illustrating an exemplary process 500 of scheduling instructions in a graphics pipeline, in accordance with an embodiment of the present invention. Steps of process 500 may be stored as instructions on a computer readable medium, which may be executed on a computer processor as a part of a device driver. Process 500 may be implemented within a system such as system 200 or 250 depicted in FIGS. 2A and 2B, respectively. However, process 500 is not so limited. In step 510, the state of a host system is accessed. The state is related to graphics processing. For example, the state may define whether certain rendering operations should be performed. The state may be stored based on received calls, such as OpenGL calls, from an application program and accessed when desired.

In step 520, a vector is computed based on the graphics state that was accessed in step 510. The vector is a binary number of any length and can be used as an index to a LUT that comprises scheduling information. It will be understood that not every aspect of the state may need to be considered in order to properly program the hardware in the graphics processing pipeline. The present invention is well-suited to consider whatever types of state variables are useful to program the hardware. In one implementation, bits are set in the vector based on whether a state variable is "enabled" or "disabled." However, embodiments of the present invention are also well-suited to base the vector on "mode" state variables, "value" state variables, and any other type of state variables.

In step 530, a memory-resident look-up table is indexed to determine an ordered sequence of macro-operations that are suitable for the current graphics state. Exemplary macro-operations include texture operation, blend operation, fog operation, and alpha operation. These examples correspond to operations in a rendering state that are substantially compliant with the OpenGL specification. However, the present invention is well-suited for other specifications. Moreover, it is not required that there be a one-to-one correspondence between operations in the graphics rendering state and macro-operations. For example, a single macro-operation can correspond to multiple operations in the graphics rendering state. Such an exemplary macro-operation is a "fog-alpha" macro-operation, which corresponds to distinct "fog" and "alpha" operations in the graphics rendering state. Furthermore, there may be more macro-operations in a given schedule than rendering operations in the corresponding graphics rendering state. For example, a "pass-through" macro-operation may be used that has no corresponding rendering operations in the graphics rendering state.

In step 540, instructions for programming the graphics pipeline based on the macro-operations are determined. This step may comprise executing modules within scheduling code according to an ordering of macro-operations in the LUT. The ordered list of macro-operations by itself does not necessarily contain all of the information to program the graphics pipeline. Therefore, additional information referred to herein as "context information" or the like may also be used in the determination of the hardware instructions. The hardware instructions may be stored in a hardware instruction cache.

In step 550, the hardware instructions are used to program a graphics pipeline, such that the state of the host system is implemented by the graphics pipeline. For example, elements in FIG. 3 such as the ALU and data fetch unit are programmed via the hardware instructions.

The preferred embodiment of the present invention, validating an integrated circuit graphics pipeline using pre-determined scheduling, is thus described. While the present invention has been described in particular embodiments, it should be appreciated that the present invention should not be construed as limited by such embodiments, but rather construed according to the below claims. In the claims, the order of elements does not imply any particular order of operations, steps, or the like, unless a particular element makes specific reference to another element as becoming before or after.

What is claimed is:

1. A method of determining a schedule of instructions for a graphics pipeline, said method comprising:
    accessing a state of a host system;
    determining a vector based on said state, wherein said vector comprises information about said state;
    indexing a table based on said vector to obtain a plurality of macro-operations associated with said state, wherein said plurality of macro-operations are associated with at least one operation to be performed by said graphics pipeline; and
    determining at least one instruction for programming said graphics pipeline to implement said state, wherein said at least one instruction is determined based on said plurality of macro-operations and also based on context information, wherein said context information comprises data associated with graphics processing that is used to perform said at least one operation.

2. The method of claim 1, wherein said at least one operation is selected from a group consisting of a texture operation, an alpha test operation, a stencil operation, a fog operation, an anti-alias operation, a depth test operation, an alpha test, a color mask operation, a blending operation, and a pass-through operation.

3. The method of claim 1, wherein said at least one other operation is selected from a group consisting of a multiply operation and an add operation.

4. The method of claim 1, wherein said context information further identifies data accessed as part of performing said at least one operation.

5. The method of claim 4, wherein said data comprises a texture map.

6. The method of claim 1, wherein said determining at least one instruction further comprises executing at least one module to generate said at least one instruction.

7. The method of claim 6 further comprising:
    determining an order of execution of said at least one module based on an ordering of said plurality of macro-operations, and
    wherein said determining at least one instruction further comprises executing said at least one module in said order of execution to generate said at least one instruction.

8. The method of claim 6, wherein said at least one module is selected from a group consisting of a texture module, an alpha test module, a fog module, an anti-alias module, a depth test module, and a color mask module.

9. The method of claim 1, wherein said state comprises at least one enable flag associated with said at least one operation.

10. The method of claim 1, wherein said state is substantially compliant with an OpenGL graphics state.

11. The method of claim 1, wherein said method is implemented by a device driver of said host system.

12. The method of claim 1, wherein said graphics pipeline comprises at least one unit selected from a group consisting of an arithmetic logic unit, a setup unit, a raster unit, a gatekeeper unit, a data fetch unit, and a data write unit.

13. The method of claim 1 further comprising:
    programming said graphics pipeline based on said at least one instruction.

14. A computer-readable memory having computer-readable program code embodied therein for causing a computer system to perform a method of determining a schedule of instructions for a graphics pipeline, said method comprising:
    accessing a state of a host system;
    determining a vector based on said state, wherein said vector comprises information about said state;
    indexing a table based on said vector to obtain a plurality of macro-operations associated with said state, wherein said plurality of macro-operations are associated with at least one operation to be performed by said graphics pipeline; and
    determining at least one instruction for programming said graphics pipeline to implement said state, wherein said at least one instruction is determined based on said plurality of macro-operations and also based on context information, wherein said context information comprises data associated with graphics processing that is used to perform said at least one operation.

15. The computer-readable memory of claim 14, wherein said at least one operation is selected from a group consisting of a texture operation, an alpha test operation, a stencil operation, a fog operation, an anti-alias operation, a depth test operation, an alpha test, a color mask operation, a blending operation, and a pass-through operation.

16. The computer-readable memory of claim 14, wherein said at least one other operation is selected from a group consisting of a multiply operation and an add operation.

17. The computer-readable memory of claim 14, wherein said context information further identifies data accessed as part of performing said at least one operation.

18. The computer-readable memory of claim 17, wherein said data comprises a texture map.

19. The computer-readable memory of claim 14, wherein said determining at least one instruction further comprises executing at least one module to generate said at least one instruction.

20. The computer-readable memory of claim 19, wherein said method further comprises:
  determining an order of execution of said at least one module based on an ordering of said plurality of macro-operations, and
  wherein said determining at least one instruction further comprises executing said at least one module in said order of execution to generate said at least one instruction.

21. The computer-readable memory of claim 19, wherein said at least one module is selected from a group consisting of a texture module, an alpha test module, a fog module, an anti-alias module, a depth test module, and a color mask module.

22. The computer-readable memory of claim 14, wherein said state comprises at least one enable flag associated with said at least one operation.

23. The computer-readable memory of claim 14, wherein said state is substantially compliant with an OpenGL graphics state.

24. The computer-readable memory of claim 14, wherein said method is implemented by a device driver of said host system.

25. The computer-readable memory of claim 14, wherein said graphics pipeline comprises at least one unit selected from a group consisting of an arithmetic logic unit, a setup unit, a raster unit, a gatekeeper unit, a data fetch unit, and a data write unit.

26. The computer-readable memory of claim 14, wherein said method further comprises:
  programming said graphics pipeline based on said at least one instruction.

27. A system comprising a processor and a memory, wherein said memory comprises instructions that when executed by said system implement a method of determining a schedule of instructions for a graphics pipeline, said method comprising:
  accessing a state of a host system;
  determining a vector based on said state, wherein said vector comprises information about said state;
  indexing a table based on said vector to obtain a plurality of macro-operations associated with said state, wherein said plurality of macro-operations are associated with at least one operation to be performed by said graphics pipeline; and
  determining at least one instruction for programming said graphics pipeline to implement said state, wherein said at least one instruction is determined based on said plurality of macro-operations and also based on context information, wherein said context information comprises data associated with graphics processing that is used to perform said at least one operation.

28. The system of claim 27, wherein said at least one operation is selected from a group consisting of a texture operation, an alpha test operation, a stencil operation, a fog operation, an anti-alias operation, a depth test operation, an alpha test, a color mask operation, a blending operation, and a pass-through operation.

29. The system of claim 27, wherein said at least one other operation is selected from a group consisting of a multiply operation and an add operation.

30. The system of claim 27, wherein said context information further identifies data accessed as part of performing said at least one operation.

31. The system of claim 30, wherein said data comprises a texture map.

32. The system of claim 27, wherein said determining at least one instruction further comprises executing at least one module to generate said at least one instruction.

33. The system of claim 32, wherein said method further comprises:
  determining an order of execution of said at least one module based on an ordering of said plurality of macro-operations, and
  wherein said determining at least one instruction further comprises executing said at least one module in said order of execution to generate said at least one instruction.

34. The system of claim 32, wherein said at least one module is selected from a group consisting of a texture module, an alpha test module, a fog module, an anti-alias module, a depth test module, and a color mask module.

35. The system of claim 27, wherein said state comprises at least one enable flag associated with said at least one operation.

36. The system of claim 27, wherein said state is substantially compliant with an OpenGL graphics state.

37. The system of claim 27, wherein said method is implemented by a device driver of said host system.

38. The system of claim 27, wherein said graphics pipeline comprises at least one unit selected from a group consisting of an arithmetic logic unit, a setup unit, a raster unit, a gatekeeper unit, a data fetch unit, and a data write unit.

39. The system of claim 27, wherein said method further comprises:
  programming said graphics pipeline based on said at least one instruction.

* * * * *